(12) United States Patent
Clavier et al.

(10) Patent No.: US 11,490,649 B2
(45) Date of Patent: Nov. 8, 2022

(54) APPARATUS FOR AERATING A PASTY PRODUCT AND FOR MIXING WITH ANOTHER PRODUCT

(71) Applicant: SOCIETE DES PRODUITS NESTLE S.A., Vevey (CH)

(72) Inventors: Luis Clavier, Lausanne (CH); Rafael Marcilla, Lisieux (FR); Jean-Francois Chevalier, Courtonne la Meurdrac (FR)

(73) Assignee: Societe des Produits Nestle S.A., Vevey (CH)

( * ) Notice: Subject to any disclaimer, the term of this patent is extended or adjusted under 35 U.S.C. 154(b) by 361 days.

(21) Appl. No.: 16/607,164

(22) PCT Filed: Apr. 24, 2018

(86) PCT No.: PCT/EP2018/060478
§ 371 (c)(1),
(2) Date: Oct. 22, 2019

(87) PCT Pub. No.: WO2018/197493
PCT Pub. Date: Nov. 1, 2018

(65) Prior Publication Data
US 2020/0046014 A1    Feb. 13, 2020

(30) Foreign Application Priority Data

Apr. 26, 2017 (EP) .................. 17168125
Apr. 26, 2017 (EP) .................. 17168127
Apr. 26, 2017 (EP) .................. 17168142

(51) Int. Cl.
A23P 30/40     (2016.01)
A23G 3/34      (2006.01)
(Continued)

(52) U.S. Cl.
CPC ............ *A23P 30/40* (2016.08); *A23G 3/0012* (2013.01); *A23G 3/0221* (2013.01);
(Continued)

(58) Field of Classification Search
CPC .... A23P 30/40; B01F 23/2351; B01F 33/811; B01F 27/2711; B01F 23/291;
(Continued)

(56) References Cited

U.S. PATENT DOCUMENTS 6,635,200 B2    10/2003  Sulzbach et al.
6,638,556 B1 *  10/2003  Desai ................. A23G 9/322
                                                        426/115
(Continued)

FOREIGN PATENT DOCUMENTS

CN    103657466 A    3/2014
DE    29709060       9/1997
(Continued)

OTHER PUBLICATIONS

Japan Patent Office Action Communication for Application No. P2019-556624, Dispatch No. 068858, Dispatch dated Feb. 22, 2022, 9 pages.
(Continued)

*Primary Examiner* — Brent T O'Hern
(74) *Attorney, Agent, or Firm* — K&L Gates LLP (57) ABSTRACT

An apparatus includes a housing with an inlet for a pasty product to be aerated and an outlet for the aerated product. The apparatus includes at least a first set of a rotor and a stator and a second set of a rotor and a stator. The apparatus further includes a gas injector for injecting, upstream of the first set of the rotor and the stator, a gas into the pasty product to be aerated. The apparatus further includes an intermediate mixing chamber provided in the housing between the first and the second sets of the rotor and the
(Continued)

stator. A secondary product introduction member protrudes into the intermediate mixing chamber so as to issue into the intermediate mixing chamber. A method for aerating a pasty product is also provided.

20 Claims, 7 Drawing Sheets

(51) Int. Cl.
  *A23G 3/02*    (2006.01)
  *B01F 23/20*    (2022.01)
  *B01F 23/235*    (2022.01)
  *B01F 27/271*    (2022.01)
  *B01F 33/81*    (2022.01)
  *B01F 35/00*    (2022.01)
  *B01F 35/71*    (2022.01)
  *B01F 101/06*    (2022.01)
  *B01F 101/12*    (2022.01)

(52) U.S. Cl.
  CPC ........ *B01F 23/2351* (2022.01); *B01F 23/291* (2022.01); *B01F 27/2711* (2022.01); *B01F 33/811* (2022.01); *B01F 35/561* (2022.01); *B01F 35/715* (2022.01); *B01F 2101/06* (2022.01); *B01F 2101/12* (2022.01)

(58) Field of Classification Search
  CPC .. B01F 35/561; B01F 35/715; B01F 2101/12; B01F 2101/06; A23G 3/0012; A23G 3/0221
  USPC ........................................................ 426/474
  See application file for complete search history.

(56) References Cited

U.S. PATENT DOCUMENTS

| | | | |
|---|---|---|---|
| 8,146,487 | B2 | 4/2012 | Koopman et al. |
| 8,985,844 | B2 | 3/2015 | Grimm |
| 9,480,964 | B2 | 11/2016 | Maskrot et al. |
| 2009/0005521 | A1* | 1/2009 | Hassan ............... B01J 8/20 |
| | | | 526/88 |
| 2010/0055266 | A1 | 3/2010 | Windhab et al. |
| 2013/0266703 | A1 | 10/2013 | Hassan et al. |
| 2015/0049575 | A1 | 2/2015 | Matula et al. |
| 2015/0078113 | A1 | 3/2015 | Gillis et al. |
| 2017/0101583 | A1 | 4/2017 | Bran et al. |
| 2017/0153561 | A1 | 6/2017 | Xu |
| 2017/0333854 | A1 | 11/2017 | Ishida et al. |

FOREIGN PATENT DOCUMENTS

| | | |
|---|---|---|
| EP | 0210905 | 2/1987 |
| JP | S6161572 U | 4/1986 |
| JP | S63152460 U | 10/1988 |
| JP | H0275132 U | 6/1990 |
| JP | H09253469 A | 9/1997 |
| WO | 9908782 | 2/1999 |
| WO | 2013068426 A1 | 5/2013 |

OTHER PUBLICATIONS

Brazil Patent Office Communication for Application No. BR112019019615-3, dated May 10, 2022, 4 pages.

* cited by examiner

FIG.15

APPARATUS FOR AERATING A PASTY PRODUCT AND FOR MIXING WITH ANOTHER PRODUCT

CROSS REFERENCE TO RELATED APPLICATIONS

The present application is a National Stage of International Application No. PCT/EP2018/060478, filed on Apr. 24, 2018, which claims priority to European Patent Application No. 17168125.7, filed on Apr. 26, 2017, European Patent Application No. 17168127.3, filed on Apr. 26, 2017, and European Patent Application No. 17168142.2, filed on Apr. 26, 2017, the entire contents of which are being incorporated herein by reference

TECHNICAL FIELD

The present invention relates to an apparatus for aeration of pasty products, and to a method for the aeration of pasty products. "Pasty" should be understood in a broad and non-restrictive manner. Pasty products comprise semi-liquid, viscous, and semi-solid products. For example, mousses (i.e. aerated food compositions) based on dairy products (i.e. milk food products), in the form of a foam obtained by whipping air or gas into a dairy base, are well known in the art. Their aerated texture is highly appreciated by the consumers. The invention relates to the aeration of such products, in particular for the food and feed industry. It may also be applied in the pharmaceutical or cosmetic industry.

BACKGROUND OF THE INVENTION

The most common industrially applied methods of aerating liquid and semi-liquid products are based on mechanical aeration. The commercially available machines vary somewhat in their design but the principles of their operation are generally similar. Moreover, examples of rotor stator mixers are described in EP 0210905 A2, GB 2105209 A and US 2017/101583 A1.

The mixing apparatus of most commercially available machines is of the rotor-and-stator type comprising a stainless steel rotor shaft covered with metal pegs which fit inside a housing that also has pegs inside it. When the mixing apparatus is assembled the pegs on the shaft and on the inside of the apparatus intermesh to provide shear force on the product flow. A liquid phase and a gas phase are combined before entering the mixing apparatus. The mixing apparatus mechanically disintegrates large gas bubbles into very small bubbles that are trapped within the food matrix. The bubble size is an essential factor that determines the product attributes.

Such machines are described for example in WO 91/07221 A1, GB 888 264 A and DE 31 27 684 A1.

WO 2013/068426 A1 discloses a device for the aeration of food products comprising a mixing head having at least one set of a rotor and a stator. Each set of a rotor and a stator comprises a rotor and a stator with complementary toothed rims which are oppositely orientated in the axial direction. An inlet cover is provided having a product inlet opening for receiving a product to be aerated and a gas injector arranged thereon and traversing the inlet cover such that the head of the gas injector is located in a headspace defined by the inlet cover and a first rotor-stator set. This device does not allow mixing and aerating of several compositions together.

DE 102015205597 B3 relates to a device for the production of a foamed first foodstuff mass, which contains a lumpy or liquid second foodstuff mass. The device comprises at one extremity a first stator housing and a first rotor. The first stator housing and first rotor are provided with radially-oriented and axially spaced-apart whipping elements. The first rotor rotates in the first stator housing. The rotor whipping elements meshes with the static whipping elements of the first stator housing. The first rotor is coupled with a first drive shaft. The device comprises at its other extremity a second stator housing and a second rotor which are constructed similarly to the first stator housing and the first rotor. The rotational speed of the first rotor for whipping can be set independently of the rotational speed of the second rotor for mixing.

DE 29709060 A1 relates to a construction kit for constructing a rotor/stator mixing device for the continuous dispersal and mixing of gases, fluids and/or solids in a fluid phase.

WO 99/08782 A1 relates to a process for the preparation of gas-containing vesicles wherein a mixture of gas, liquid and vesicle membrane forming material is passed through a zone in which it is subject to shear forces exerted by surfaces moving relative to each other at a speed of at least 20 m/s.

Disadvantages of the commercially available systems include limitations on the versatility of the apparatus, e.g. with respect to inlet of different fluids and/or the size of bubbles obtained amongst others.

This drawback may be partially overcome by providing an apparatus for aerating a pasty product (e.g. a food product) comprising a further inlet for injecting, at a position between an upstream set of a rotor and a stator and an adjacent downstream set of a rotor and a stator, a secondary product to be mixed with the food product.

However, such apparatuses are limited with respect to the homogeneous mixing and aeration of food products, in particular regarding the secondary product. The secondary product may be a liquid, a semi-liquid, a gas, or any combination thereof. The secondary product may also be or comprise solid pieces.

The apparatuses according to the prior art also do not make it possible to provide the requested characteristics to the output product (e.g. a cream having homogeneously distributed solid inclusions such as chocolate chunks) for all different types of secondary product that it may be desired to input.

Even the most technically advanced apparatuses cannot produce every kind of aerated pasty product, as their versatility in terms of whipping remains limited. Any given apparatus is designed for producing a specific product, but it cannot be adapted easily to the production of a wider range of products, e.g. to aerated base products having different properties (amount of gas, size of the bubbles, etc.) mixed with different kinds of secondary products (gas, liquid, semi-liquid, solid pieces, or combination thereof, which may be products whose properties change when they are introduced in the aerated base product).

SUMMARY OF THE INVENTION

It is an object of the invention to provide an apparatus and method for the aeration of food products that overcome one or more disadvantages of the known systems, in particular with respect to the introduction of a secondary product into a pasty product.

Accordingly, an aspect of the invention proposes an apparatus for aerating a pasty product, the apparatus comprising a housing extending in a longitudinal direction, said housing comprising an inlet (4) for the pasty product to be aerated and an outlet for the aerated product, and, within the housing, at least a first set of a rotor and a stator and a second set of a rotor and a stator, wherein each set of a rotor and a stator has complementary toothed rims oppositely orientated in the longitudinal direction, said apparatus comprising a drive shaft, the rotors of each set of a rotor and a stator being coupled to said drive shaft. Said apparatus further comprises a gas injector for injecting, upstream of the first set of a rotor and a stator, a gas into the pasty product to be aerated, characterized in that the apparatus further comprises an intermediate mixing chamber provided in the housing between the first and the second sets of a rotor and a stator, and a secondary product introduction means which protrudes into the intermediate mixing chamber so as to issue into said intermediate mixing chamber.

Compared to existing systems, introduction of a secondary product inside the mixing chamber, at a distance from the wall of the mixing chamber, provides a better distribution or homogenization of the secondary product into the aerated pasty product, and increases the travel time of the secondary product into the pasty product before it reaches a set of a rotor and a stator.

In an embodiment, the secondary product introduction means comprise a fluid injector. In another embodiment, the secondary product introduction means forms a secondary pasty product inlet.

In an embodiment, the intermediate mixing chamber has a cylindrical shape centered on a shaft rotation axis and wherein secondary product introduction means protrude in the intermediate mixing chamber at a distance from an external surface of the shaft comprised between 10% and 95% of the distance, along a radius of the intermediate mixing chamber, between said external surface of the shaft and a wall of the housing, and preferably between 20% and 70% of said distance, and more preferably between 25% and 50% of said distance.

In an embodiment, the housing comprises an internal annular step along the length, in the longitudinal direction, of the intermediate mixing chamber. Preferably, the intermediate mixing chamber has a cylindrical shape centered on a shaft rotation axis, having a diameter which is lower than the diameter of a rotor.

In an embodiment, the intermediate mixing chamber is a volume free of mechanical parts except for said fluid injector.

In an embodiment, the intermediate mixing chamber has a length corresponding to at least the length of a set of a rotor and a stator.

In an embodiment, the housing comprises, in the longitudinal direction, a plurality of modules, said plurality of modules comprising:
an inlet module comprising a product inlet and a gas injector;
at least one intermediate housing module, configured to form the intermediate mixing chamber, and
an outlet module, comprising a product outlet opening.

Preferably, each intermediate housing module is arranged to receive one, two or three sets of a rotor and a stator.

In an embodiment, the rotor of each set of a rotor and a stator is coupled to the longitudinal drive shaft and the stator of each set of a rotor and a stator is coupled to the housing.

In an embodiment, the apparatus comprises a first shaft coupled to the rotor of at least a first set of a rotor and a stator, and a second shaft coupled to the rotor of at least a second set of a rotor and a stator.

In an embodiment, the first shaft and the second shaft are coaxial with a longitudinal axis of the apparatus.

In an embodiment, the apparatus is configured to drive the first shaft and the second shaft at different rotational speeds and/or in opposite directions.

In an embodiment, the apparatus comprises independent driving means rotationally driving the first shaft and the second shaft respectively.

In an embodiment, an intermediate chamber is formed between a pair of a rotor and a stator coupled to the first shaft and a pair of a rotor and a stator coupled to the second shaft.

In an embodiment, the apparatus comprises a secondary product introduction means for introducing a secondary product into the intermediate chamber formed between a pair of a rotor and a stator coupled to the first shaft and a pair of a rotor and a stator coupled to the second shaft.

In an embodiment, the pairs of a rotor and a stator coupled to the first shaft are enclosed in a first housing part, and the pairs of a rotor and a stator coupled to the second shaft are enclosed in a second housing part.

In an embodiment, the intermediate chamber is formed between the first housing part and the second housing part by an intermediate housing part.

In another aspect, the invention proposes a method for aerating a pasty product comprising passing a stream of pasty product to be aerated through an apparatus according to any one of the preceding claims, injecting via the upstream gas injector a gas into the pasty product stream at a position upstream relative to the first set of a rotor and a stator, and injecting a secondary product via the secondary product introduction means into the intermediate mixing chamber.

In an embodiment, the pasty product is a dairy food product.

In an embodiment, the gas introduced into the pasty product via the upstream gas injector is chosen from air, nitrogen, carbon dioxide, nitrous oxide, and combinations thereof.

In an embodiment, the secondary product is chosen from air, nitrogen, carbon dioxide, nitrous oxide, liquid chocolate, liquid caramel, a fruit coulis, a flavored sauce, and combinations thereof

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

As used in this specification, the words "comprises", "comprising", and similar words, are not to be interpreted in an exclusive or exhaustive sense. In other words, they are intended to mean "including, but not limited to".

The invention is further described with reference to the following examples. It will be appreciated that the invention as claimed is not intended to be limited in any way by these examples.

Figure 1:
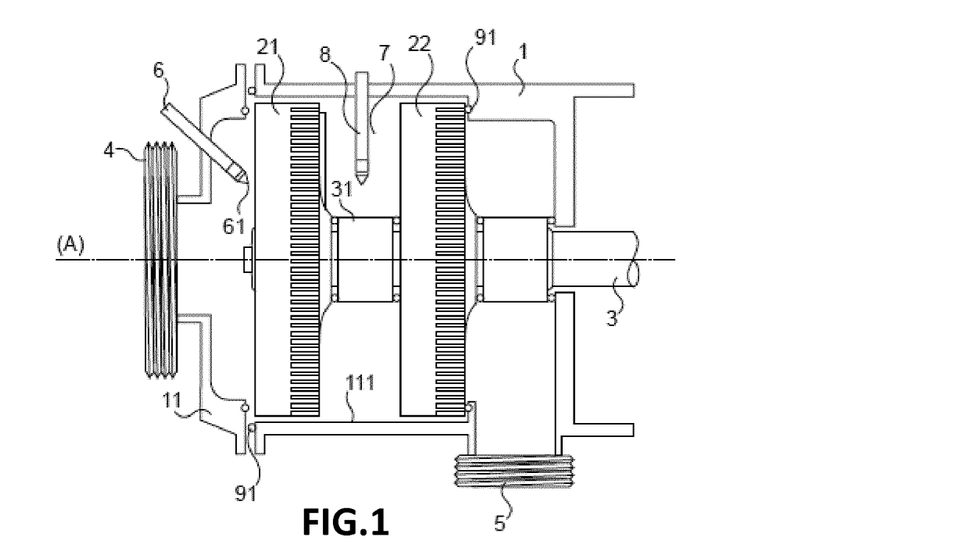
FIG. 1 is a schematic cross-sectional representation of an apparatus according to an embodiment of the invention.

FIG. 1 is a schematic cross-sectional representation of an apparatus for aerating a pasty product according to an embodiment of the invention.

The represented apparatus for aerating a pasty product comprises a housing 1, in which two sets of a rotor and a stator 21, 22 are housed. In the represented embodiment, the housing 1 has a substantially tubular form. The housing 1 extends in a longitudinal direction.

The sets of a rotor and a stator 21,22 are aligned in series along a central drive shaft 3, extending in the longitudinal direction along a central longitudinal axis A.

Each set of a rotor and a stator 21,22 comprises a rotor and a corresponding stator. The rotors are coupled to the drive shaft 3 and driven in rotation around the longitudinal axis of the drive shaft 3 by a motor drive (not shown) coupled to the shaft 3. The motor drive can be directly or indirectly coupled to the drive shaft 3. The direction of rotation may be clockwise or anti-clockwise about the rotation axis of the drive shaft 3 (corresponding to the longitudinal axis A). Typical rotation speeds of the drive shaft 3 may vary from 50 RPM to 1500 RPM.

In the embodiment illustrated the stators are coupled to the internal wall of the housing 1 which has a cylindrical shape in the represented embodiment of the invention.

The rotors have one or more toothed rims which cooperate with complementary toothed rims on the stators which are oppositely orientated in the axial direction.

In the embodiment represented in FIG. 1, the apparatus for aerating a pasty product is provided with two sets of a rotor and a stator 21,22, namely a first set of a rotor and a stator 21 and a second set of a rotor and a stator 22. The first set of a rotor and a stator 21 is upstream of the second set of a rotor and a stator 22, with respect to the general direction of the product flow in the apparatus, from a product inlet 4 to an aerated product outlet 5.

In this embodiment, the apparatus has a product inlet 4 provided in an inlet cover or inlet module 11. The product inlet 4 is configured for receiving a stream of a pasty (e.g. liquid or semi-liquid) product to be aerated from a product feed-line (not represented). In the represented embodiment, the product inlet is located centrally in the inlet cover, along the longitudinal axis A. A pump (not shown) may be used to inject the liquid or semi-liquid product into the apparatus and through the series of sets of a rotor and a stator 21, 22.

A gas injector 6 is positioned in the inlet cover for the introduction of gas under pressure into the apparatus.

In general, gas may be injected into the mixing apparatus under a pressure in the range of from about 0.5 bars to about 10 bars. The outlet tip 61 of the gas injector is located in a space upstream to the first set of a rotor and a stator 21. The gas injection may be carried out in the vicinity of the first set of a rotor and a stator 21.

The position of the gas injector 6 is important for providing an efficient incorporation of the gas into the pasty product stream, e.g. for producing regular and uniform gas bubbles in the pasty product stream.

The gas injector 6 can be positioned with its central axis parallel to the longitudinal axis A of the apparatus (and/or product inlet) or inclined at an angle of from 10° to about 85° relative to said longitudinal axis A of the apparatus. The inclination of the central axis of the gas injector 6 makes it possible to optimize the flow of the injected gas onto the teeth of the first set of a rotor and a stator 21. The position of the gas injector tip provides good control of the applied shearing and cutting forces and avoids the formation of gas pockets in the product stream.

Gas entering the apparatus under pressure via the gas injector 6 flows onto the toothed rims of the first set of a rotor and a stator 21 and is directly subjected to the high shear and cutting forces provided by the toothed set of a rotor and a stator. The rotation of the rotors in each set of a rotor and a stator 21,22 pumps the product stream and the gas bubbles outwardly through the shear gaps between the rotor teeth and the stator teeth, creating a localized high shear condition. High shear forces exerted on the product stream in shear gaps between the rotor teeth and the stator teeth through which product flows provides homogenization of the product stream and the production of a homogenous aeration of the product, with small gas bubbles.

The apparatus further comprises an intermediate mixing chamber 7 provided in the housing between the first and the second sets of a rotor and a stator. The mixing chamber 7 is a clear volume inside the housing 1 (i.e. a volume free of mechanical parts except for the fluid injector), located between sets of a rotor and a stator. The mixing chamber 7 allows homogenization of the product stream downstream a set of a rotor and a stator and before a next (downstream) set of a rotor and a stator. The mixing chamber 7 contributes to the expansion and stabilization of the aerated product. The mixing chamber 7 may be the clear volume defined by: a face of an upstream set of a rotor and a stator, a face of a downstream set of a rotor and a stator, wall or walls of the housing between said upstream and downstream sets, and the surface 31 of the drive shaft 3 situated between said upstream and downstream sets. In the embodiment represented in FIG. 1, a mixing chamber 7 is provided between the first set of a rotor and a stator 21 (as upstream set) and the second set of a rotor and a stator 22 (as downstream set).

In the represented embodiment of the invention, the apparatus further comprises secondary product introduction means comprising a fluid injector 8, for introduction of a secondary product into the mixing chamber 7.

As previously explained, the secondary product may be a liquid, a semi-liquid, a gas, or any combination thereof. The secondary product may in particular be a liquid or semi-liquid composition which solidifies shortly after injection into the food product, for example when cooled. For example, the pasty product flowing in the apparatus may be maintained at a low temperature. The secondary product may be a molten chocolate composition, or a liquid caramel composition, at a higher temperature than the temperature of the pasty product. Due to the difference of temperature, the additional composition cools down shortly after injection into the pasty product. This causes an increase of the viscosity of the secondary product, or even causes the secondary product to solidify.

Depending on the physical nature of the secondary product, the fluid injector 8 may be for example a gas injector, or a secondary pasty product inlet. Secondary product introduction means may comprise a tube having a diameter and an opening at its end having a section sufficient to conveniently deliver the secondary pasty product.

The fluid injector 8 (or other secondary product introduction means) is configured to protrude into the mixing chamber 7 to issue into said mixing chamber 7. The secondary product may thus be introduced inside the mixing chamber 7, into the pasty product stream, at a desired distance from the drive shaft 3 (depending on the protrusion of the fluid injector 8 inside the mixing chamber 7). It may thus be desirable to introduce the secondary product close to the drive shaft 3 that crosses the mixing chamber 7, i.e. as much as possible near to the center of the mixing chamber 7.

The secondary product introduction means may for example extend in the intermediate mixing chamber 7 to inject a secondary product at a distance from an external surface 31 of the shaft 3 comprised between 10% and 95% of the distance, along a radius of the intermediate mixing chamber 7 (provided that the mixing chamber 7 is a shape defined by a surface of revolution, such as a cylinder shape), between the external surface 31 of the shaft 3 and an inner wall 111 of the housing 1. The distance may be adapted depending on the pasty product, the secondary product, and the configuration of the apparatus. For example, the secondary product introduction means may extend in the intermediate mixing chamber 7 to inject a secondary product at a distance from an external surface of the shaft 3 comprised between 20% and 70% of said distance, or 25% and 50% of said distance.

The secondary product is not introduced directly in front of the toothed rims of a rotor. Because the secondary product is introduced in the thick of the stream of aerated pasty product in the apparatus, not only at its surface along the inner wall 111 of the housing 1, the secondary product may be homogeneously mixed into the aerated pasty product. The secondary product is immediately surrounded by aerated pasty product after introduction in said aerated pasty product. If the secondary product solidifies (partially or completely) after introduction into the stream of pasty product, or, more generally speaking if its physical properties change after introduction into the pasty product, this change of properties is enhanced thanks to the introduction of said secondary product into the thick of the pasty product stream and the increase of travel time of the secondary product introduced before it reaches the second set of a rotor and a stator 22.

The housing 1 comprises a product outlet 5 for the aerated product comprising the mixed secondary product. Preferably, a back-pressure regulator (not illustrated) is provided in the product stream downstream of the product outlet 5. In some embodiments, the back-pressure regulator is in the form of a membrane back pressure valve, for example a double-membrane back-pressure valve. However, other suitable back-pressure regulator systems are envisaged. Advantageously, the back-pressure regulator makes it possible to control the pressure in the mixing chamber 7 and to ensure steady flow of the product through the mixing apparatus.

Figure 2:
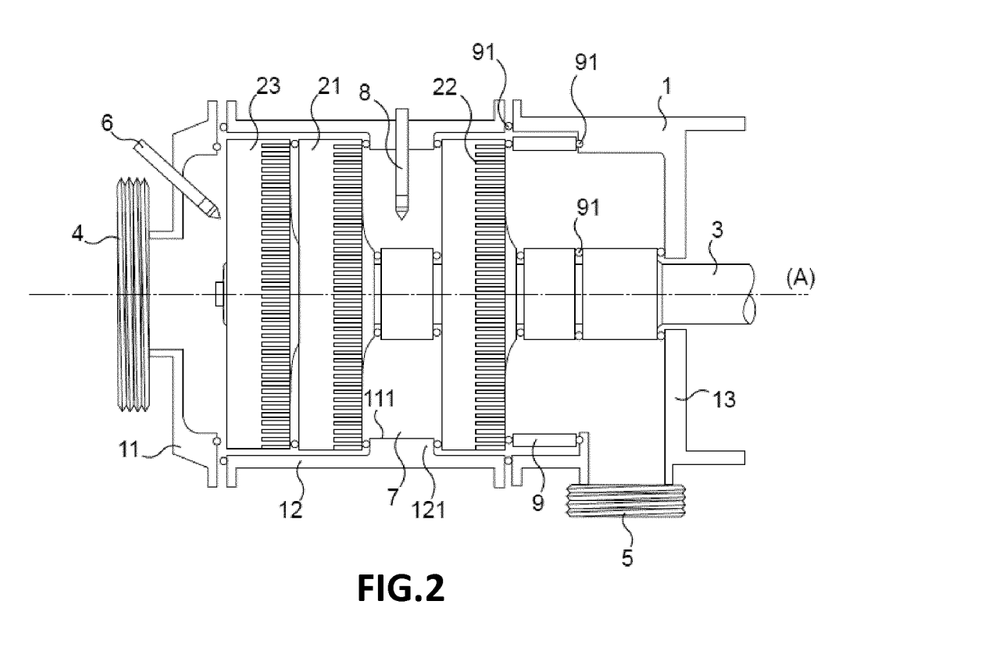
FIG. 2 is a schematic cross-sectional representation of an apparatus according to another embodiment of the invention.

FIG. 2 is a schematic cross-sectional representation of an apparatus according to an alternative embodiment of the invention. The embodiment of FIG. 2 differs from the embodiment of FIG. 1 in that it comprises three sets of a rotor and a stator 21,22,23, and another housing configuration.

In the represented example embodiment, a third set of a rotor and a stator 23 is provided upstream of the first set of a rotor and a stator 21. The number, position, and parameters (form, size and number of teeth) of the sets of a rotor and a stator 21,22,23 is adapted to the pasty product, the secondary product introduced, and the desired characteristics of the desired final aerated product.

Regarding the housing 1 of the apparatus, the variant embodiment represented in FIG. 2 (and FIG. 3 as hereafter explained) is based on a modular construction. The housing 1 of the apparatus of FIG. 2 comprises an inlet module 11, an intermediate housing module 12, and an outlet module 13.

The inlet module 11 comprises the product inlet 4 and the gas injector 6. The intermediate housing module 12 is configured to form the intermediate mixing chamber 7 between the first set of a rotor and a stator 21 and the second set of a rotor and a stator 22. The outlet module 13 comprises the product outlet 5 opening. In the represented embodiment, it also comprises a hole for the drive shaft 3 to enter the housing 1.

The intermediate housing module 12 may be configured to receive one, two or three sets of a rotor and a stator. In the represented embodiment of FIG. 2, the intermediate housing module 12 is configured to receive three sets of a rotor and a stator. The intermediate module of the housing may comprise an internal annular step 121 in its longitudinal direction. This defines places for sets of a rotor and a stator upstream and downstream said annular step 121. In the represented embodiment, two sets may be positioned upstream of the annular step 121 and one set may be positioned downstream of the annular step 121 in the intermediate housing module 12.

The annular step 121 may also help maintaining in position the stators of adjacent sets of a rotor and a stator. The annular step 121 may also enhance the seal into the housing, avoiding a stream of product to form at the periphery of a set of a rotor and a stator. To provide this seal, O-rings may be placed between the step 121 and the adjacent sets of a rotor and a stator.

The functions of an annular step may be obtained by a spacer ring 9 (not represented in the embodiment of FIG. 1, and corresponding to the spacer ring 9 of FIGS. 2 and 3) having the right diameter to fit inside the housing 1, and a thickness adapted to maintain in the longitudinal direction the adjacent sets of a rotor and a stator and to accommodate a O-ring between the spacer-ring and said adjacent sets of a rotor and a stator. When it is used to form an intermediate chamber between two sets of a rotor and a stator, the spacer-ring may comprise a feature such as a hole or a longitudinal groove to allow a fluid injector to pass through the ring.

The outlet module 13 is configured to receive an additional set of a rotor and a stator. However, in the represented embodiment, a spacer ring 9 is used in place of a set of a rotor and a stator. Such a spacer ring 9 may be used in place of any set of a rotor and a stator to provide mechanical holding of the sets of a rotor and a stator into the apparatus.

In the represented embodiment of the invention, the annular step 121 defines the intermediate mixing chamber 7 of the apparatus. More particularly, the annular step 121 defines the wall 111 of the intermediate mixing chamber 7. This causes the intermediate mixing chamber 7 to have a cylindrical shape centered on the longitudinal axis A, having a diameter which is smaller than the diameter of a rotor. In the represented embodiment, the intermediate mixing chamber 7 has a length substantially equal to the length of a set of a rotor and a stator. The length of the intermediate mixing chamber 7 may however be shorter or longer.

Figure 3:
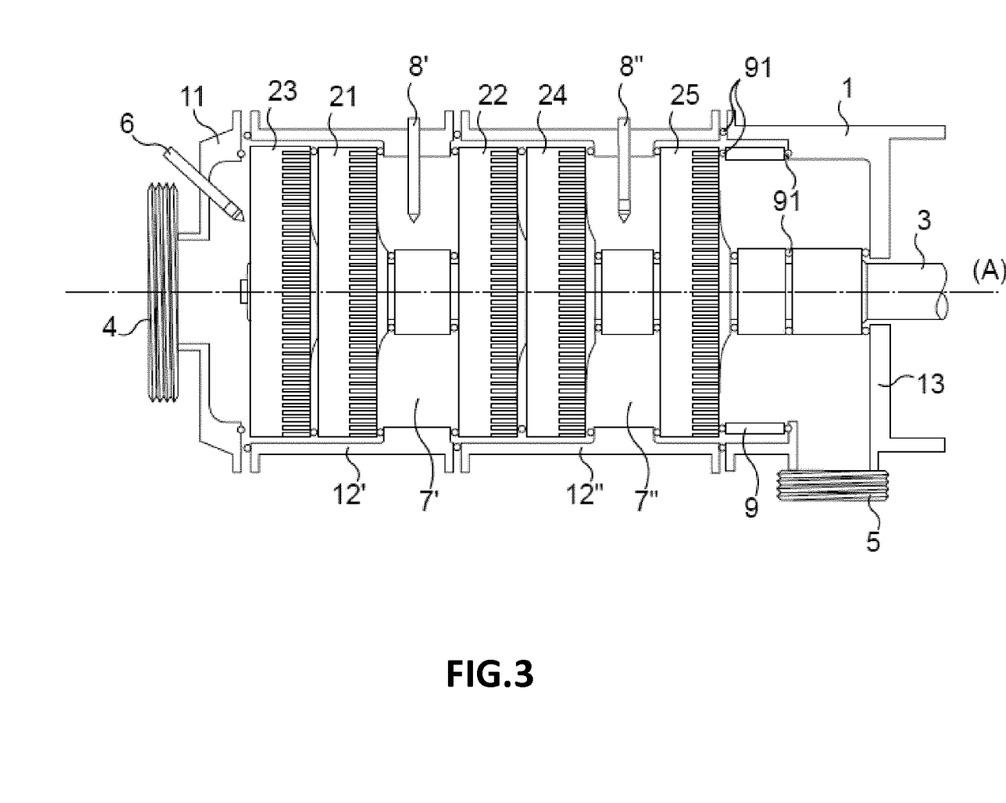
FIG. 3 is a schematic cross-sectional representation of an apparatus according to yet another embodiment of the invention.

FIG. 3 is a schematic cross-sectional representation of an apparatus according to yet another alternative embodiment of the invention. Compared to the embodiment represented in FIG. 2, the housing 1 comprises two intermediate housing modules 12', 12". A first intermediate housing module 12' hosts the third and the first sets of a rotor and a stator 23,21; a second intermediate housing module hosts the second, a fourth, and a fifth set of a rotor and a stator 22,24,25. As in the embodiment of FIG. 2, a spacer ring 9 is provided in the outlet module.

The embodiment of the invention shown in FIG. 3 comprises two intermediate mixing chambers, namely a first intermediate mixing chamber 7' between the first and the second sets of a rotor and an stator 21,22, and a second intermediate mixing chamber 7" between the fourth and the fifth sets of a rotor and a stator 24,25. A first fluid injector 8' is configured to introduce a first secondary product into the first intermediate mixing chamber 7, and a second fluid injector 8" is configured to introduce a second secondary product into the second intermediate mixing chamber 7". The first and second secondary product may be the same or not. They may be of the same type (gas, liquid, semi-liquid, etc.) or not. The apparatus may be configured to introduce the first and second secondary product at the same time or sequentially.

More generally, various configurations of sets of a rotor and a stator may be used to form an apparatus according to various embodiments of the invention, corresponding to the represented embodiments and other possible embodiments.

In every embodiments of the invention, each set of a rotor and a stator may comprise two or more rows of rotor and stator teeth. The number of rows of rotor and stator teeth on each rotor-and-stator stage may vary along the mixing apparatus. In a particular embodiment, the rotors and stators of all of the rotor-stator stages have the same number of rows of teeth. In various embodiments at least one rotor stator set comprises two rows of rotor-stator teeth, three rows of rotor-stator teeth, or four rows of rotor-stator teeth.

The number, width and/or spacing between rotor teeth can vary between the rows of teeth on a particular rotor in a particular set of a rotor and a stator. In a preferred embodiment, the spacing between the teeth is substantially the same on a particular rotor. The number, width and/or spacing between stator teeth can vary between the rows of teeth on a particular stator depending on the product to be aerated. In a preferred embodiment, the spacing between the teeth is substantially the same on a same stator. The complementary axially opposed teeth on the rotor and the stator of a particular rotor-and-stator set may have corresponding number, width and spacing of the teeth.

In embodiments, rotors comprise at least ten rotor teeth circumferentially spaced about the circumference of each rotor.

Configuration of teeth of the sets of a rotor and a stator and the rotation speed of the drive shaft 3 may be adapted to change the shear rate along the product flow path in the apparatus. For instance, the shear rate varies proportionately with rotor speed, inversely with rotor/stator gap width, and inversely with angular distance between two teeth of a same row. The rotor/stator gap width is the radial distance between a rotor teeth row and an adjacent stator teeth row.

A hollow jacket (not represented) may be provided around the housing 1. The jacket and the housing define a space for circulation of a coolant or heating fluid. The use of a jacket makes it possible to maintain the product to be aerated at a desired temperature. In some embodiments a coolant fluid is circulated in the jacket in order to maintain a chilled temperature in the product flowing through the apparatus. The circulation of a coolant fluid makes it possible to prevent the uptake of heat energy that would be generated by the rotation speeds inside the mixing apparatus. Advantageously, this helps to maintain the degree and stability of the aeration in the product. Any coolant or heating fluid may be envisaged. Exemplary coolant fluids include air or water at cold temperature.

The temperature of the coolant or heating fluid can be adapted depending on the product to be aerated and the desired aeration properties of the product.

Figure 4:
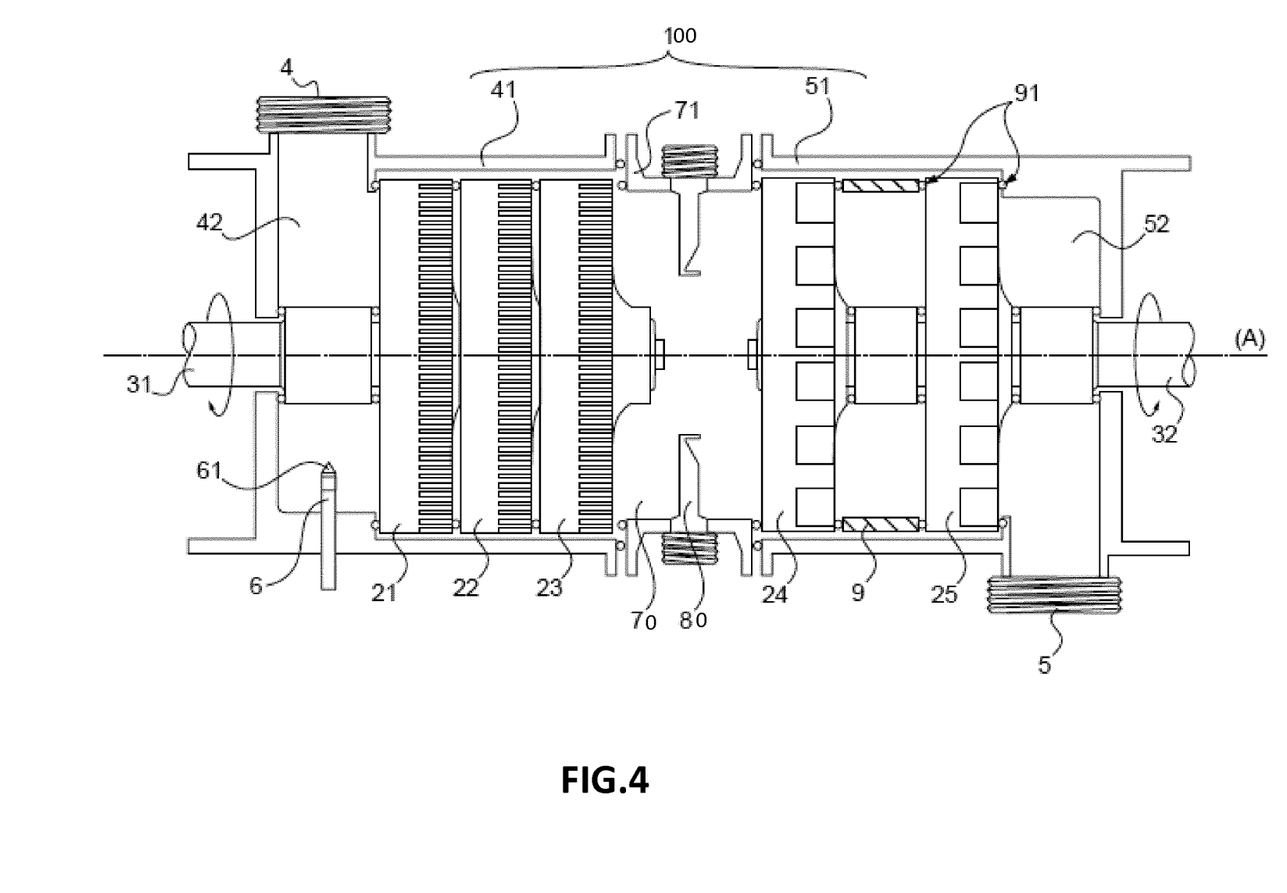
FIG. 4 is a schematic cross-sectional representation of an apparatus according to yet another embodiment of the invention.

FIG. 4 is a schematic cross-sectional representation of an apparatus for aerating a pasty product according to an embodiment of the invention.

The represented apparatus for aerating a pasty product comprises a housing 100, in which five sets of a rotor and a stator, namely a first set of a rotor and a stator 21, a second set of a rotor and a stator 22, a third set of a rotor and a stator 23, a fourth set of a rotor and a stator 24 and a fifth set of a rotor and a stator 25, are housed. In the represented embodiment, the housing 100 extends in a longitudinal direction.

In the represented embodiment of FIG. 4, the sets of a rotor and a stator 21, 22, 23, 24, 25 are aligned in series along a longitudinal axis A extending in the longitudinal direction of the housing 100 of the apparatus. The first set of a rotor and a stator 21 is upstream of the second set of a rotor and a stator 22, which is upstream of the third set of a rotor and a stator 23, and so on, with respect to the general direction of the product flow in the apparatus, from a product inlet 4 to an aerated product outlet 5.

Each set of a rotor and a stator 21,22,23,24,25 comprises a rotor and a corresponding stator.

In the embodiment illustrated, the stators are coupled to the internal wall of the housing 100 which has a cylindrical shape in the represented embodiment of the invention.

The rotors have one or more toothed rims which cooperate with complementary toothed rims on the stators which are oppositely orientated in the axial direction. Each rotor is coupled to a drive shaft that drives it in rotation. In the represented example embodiment, the first, second and third sets of a rotor and a stator 21,22,23 are coupled (i.e. their rotor is coupled) to a first drive shaft 31. The fourth and fifth sets of a rotor and a stator 24,25 are coupled to a second drive shaft 32.

Because the sets of a rotor and a stator 21,22,23,24,25 are distributed between two shafts, the length of each shaft is reduced compared to an apparatus having the same number of sets of a rotor and a stator coupled to a single shaft. This reduces the forces applied on each shaft 31,32, and limits in particular the moment applied on the shaft bearing (e.g. where a shaft enters into the housing 100) that could bent the shaft.

In the represented embodiment of FIG. 4, the first shaft 31 and the second shaft 32 are coaxial and aligned with the longitudinal axis A.

Many apparatus configurations are possible, as the two shafts may be aligned or not. Apparatuses having a general configuration in "L" (with two perpendicular shafts) or in "U" (with two parallel shafts) may be provided.

Preferably, the apparatus is configured to drive the first shaft and the second shaft at different rotational speeds and/or in opposite directions. This can be obtained by various mechanisms or configurations. In an embodiment of the invention, the driving of the first drive shaft 31 and the driving of the second drive shaft 32 are independent. To achieve this, the first drive shaft may be rotationally driven by a first drive motor (directly or through a transmission mechanism) and the second drive shaft may be rotationally driven by a second drive motor (directly or through a transmission mechanism). The first drive motor and the second drive motor may be controlled independently. In another embodiment of the invention, driving the first and second shaft 31, 32 at different speeds and/or in opposite directions may be obtained by different transmission systems between a single drive motor and respectively the first shaft 31 and the second shaft 32.

Transmission systems that may be used in the invention comprise a drive chain or belt, a gear assembly or gear train (with or without reducer), and any other known transmission system that can change the rotation speed or rotation direction of a drive motor.

This makes it possible to provide the sets of rotor and a stator coupled to the first shaft 31 and the sets of a rotor and a stator coupled to the second shaft 32 with distinct functions or effects on the stream of pasty product flowing in the apparatus. For example, the first shaft 31 may be driven at a high rotation speed and gas be introduced upstream of the rotors driven by said first shaft 31 to form a highly aerated mousse with small gas bubbles, while the second shaft 32 may be driven at a low rotation speed to mix into the mousse solid inclusions introduced or formed between the sets of a rotor and a stator coupled to the first shaft 31 and the sets of a rotor and a stator coupled to the second shaft 32, without breaking the inclusions into pieces. The mixing obtained by the sets coupled to the second shaft 32 may be enhanced by driving the shafts in opposite directions. Typical rotation speeds of the drive shafts 31, 32 may vary from 50 RPM to 1500 RPM. A high rotation speed may be chosen for example for whipping a pasty product with gas to form a mousse having small bubbles. A low rotation speed may be chosen to mix, whether or not homogeneously, a secondary product (fluid, semi liquid, or solid pieces). The mixing at a low rotation speed does not alter the properties of the base product into which the secondary product is mixed (e.g. the texture of a mousse is not altered), or the properties of the secondary product (e.g. solid pieces are not broken into pieces).

The size of the teeth of each set of a rotor and a stator may be chosen in combination with the rotation speed of the rotor (i.e. of the corresponding drive shaft), depending on the desired effect. For example, small teeth may be used to form small gas bubbles in a product (preferably in combination with a high rotation speed) and big teeth may be used not to break solid inclusions (preferentially in combination with a low rotation speed).

Configuration of teeth of the sets of a rotor and a stator 21,22,23,24,25 and the rotation speed of the corresponding drive shaft 31, 32 may be adapted to change the shear rate along the product flow path in the apparatus. For instance, the shear rate varies proportionately with rotor speed, inversely with rotor/stator gap width, and inversely with angular distance between two teeth of a same row. The rotor/stator gap width is the radial distance between a rotor teeth row and an adjacent stator teeth row.

In the represented embodiment of FIG. 4, the apparatus has a product inlet 4 provided in an inlet module that forms a first housing part 41 of the housing 100. The product inlet 4 is configured for receiving a stream of a pasty (e.g. liquid or semi-liquid) product to be aerated from a product feed-line (not represented). A pump (not shown) may be used to inject the liquid or semi-liquid product into the apparatus and through the series of sets of a rotor and a stator 21,22,23,24,25.

In the represented embodiment of FIG. 4, the product inlet is substantially at a right angle to the longitudinal axis A. In other variant embodiments, the product inlet may form an acute angle relative to the longitudinal axis A. The product inlet is preferably arranged on a peripheral side of the inlet module, because the first shaft 31 enters in the inlet module by a hole formed at an end of the housing 100 along the longitudinal axis A.

The product inlet may open into an inlet chamber 42. The inlet chamber 42 essentially consists in a volume free of mechanical parts except for a gas injector 6, situated in the inlet module upstream of the first set of a rotor and a stator 21.

The gas injector 6 is positioned in the inlet module for the introduction of gas under pressure into the apparatus. The gas injector may inject a gas (e.g. air, nitrogen, carbon dioxide, nitrous oxide, or a combination thereof) into the inlet chamber. The outlet tip 61 of the gas injector is thus located in the inlet chamber. In general, gas may be injected into the mixing apparatus under a pressure in the range of from about 0.5 bars to about 10 bars.

The position of the gas injector 6 is important for providing efficient incorporation of the gas into the pasty product stream, e.g. for producing regular and uniform gas bubbles in the pasty product stream. Many positions and orientations of the gas injector 6 may be used. The choice of the position and orientation of the gas injector 6 makes it possible to optimize the flow of the injected gas onto the teeth of the first set of a rotor and a stator 21. The position of the gas injector tip provides good control of the applied shearing and cutting forces and avoids the formation of gas pockets in the product stream.

Gas entering the apparatus under pressure via the gas injector 6 flows onto the toothed rims of the first set of a rotor and a stator 21 and is subjected to the high shear and cutting forces provided by the toothed set of a rotor and a stator. The rotation of the rotors in each set of a rotor and a stator 21,22 pumps the product stream and the gas bubbles outwardly through the shear gaps between the rotor teeth and the stator teeth, creating a localized high shear condition. High shear forces exerted on the product stream in shear gaps between the rotor teeth and the stator teeth through which fluid flows provides homogenization of the product stream and the production of a homogenous aeration of the product, with small gas bubbles.

The housing 100 comprises a product outlet 5 for the aerated product comprising the mixed secondary fluid. The product outlet is provided in an outlet module that forms a second housing part 51 of the housing 100. Preferably, a back-pressure regulator (not illustrated) is provided in the product stream downstream of the product outlet 5. In some embodiments the back-pressure regulator is in the form of a membrane back pressure valve, for example a double-membrane back-pressure valve. However other suitable back-pressure regulator systems are may be provided. Advantageously the back-pressure regulator makes it possible to control the pressure in the mixing chamber 70 and to ensure steady flow of the product through the mixing apparatus.

In the represented example of FIG. 4, the first housing part 41 and the second housing part 51 have a similar shape, except that the inlet module formed by the first housing part 41 is adapted to receive a gas injector 6. In embodiments, an identical module may be used as first housing part 41 and as second housing part 51. For example, the inlet module may be provided with a tapered hole through one of its walls where the gas injector may be placed, while for the outlet module a closing screw may be placed into the tapered hole to seal it.

In the represented embodiment, the product outlet is substantially at a right angle to the longitudinal axis A. In other variant embodiments, the product outlet may form an acute angle relative to the longitudinal axis A. The product outlet 5 is preferably arranged on a peripheral side of the inlet module, because the second shaft 32 enters the outlet module by a hole formed at an end of the housing 100 along the longitudinal axis A.

The product outlet may open into an outlet chamber 52. The outlet chamber 52 essentially consists in a volume free of mechanical parts situated in the outlet module downstream of the last set of a rotor and a stator 21.

The first, second, and third sets of a rotor and a stator 21,22,23, and the first drive shaft 31 are housed in the first housing part 41. The fourth and fifth sets of a rotor and a stator 24,25, and the second drive shaft 32 are housed in the second housing part 51. The first housing part 41 and the second housing part 51 are both adapted to receive up to three sets of a rotor and a stator. When only one or two sets of a rotor and a stator are provided in the first or second housing part, a spacer ring 9 may be provided in place of a set.

The spacer ring 9 has the right diameter to fit inside the housing 100, and a thickness adapted to maintain in the longitudinal direction the adjacent sets of a rotor and a stator and to accommodate an O-ring 91 between the spacer-ring and said adjacent sets of a rotor and a stator (or a wall of the housing).

As in the represented example of FIG. 4, the spacer ring 9 may be used to form a free chamber between two sets of a rotor and a stator (e.g. to increase the travel time of the product to enhance mixing with the secondary product, and/or to smooth the turbulent stream after a set of a rotor and a stator).

The represented apparatus also comprises an intermediate housing part 71 which forms an intermediate chamber 70 between the third and the fourth sets of a rotor and a stator, or, in other words, between the first housing part 41 and the second housing part 51. The intermediate chamber 70 allows homogenization of the product stream downstream a set of a rotor and a stator and before a next (downstream) set of a rotor and a stator. The intermediate chamber 70 may contribute to the expansion and stabilization of the aerated product.

The intermediate chamber 70 is a clear volume inside the housing 100, i.e. a volume free of mechanical parts except for at least one secondary product introduction means 80, such as a secondary product injector for a gas, fluid, or semi-liquid secondary product. For semi-liquid products or solid pieces, the secondary product introduction means 80 may comprise a tube having a diameter and an opening at its end having a section sufficient to conveniently deliver the secondary product.

As previously explained, the secondary product may be a liquid, a semi-liquid, a gas, solid pieces, or any combination thereof. The secondary product may in particular be a liquid or semi-liquid composition which solidifies shortly after injection into the food product, for example when cooled. For example, the pasty product flowing in the apparatus may be maintained at a low temperature. The secondary fluid may be a molten chocolate composition, or a liquid caramel composition, at a higher temperature than the temperature of the pasty product. Due to the difference of temperature, the additional composition cools downs shortly after injection into the pasty product. This causes an increase of the viscosity of the secondary fluid, or even causes the secondary fluid to solidify.

The secondary product introduction means 80 is configured to protrude into the intermediate chamber 70 to issue into said intermediate chamber 70. The secondary product may thus be introduced inside the intermediate chamber 70, into the (aerated) pasty product stream. It may thus be desirable to introduce the secondary product close to the longitudinal axis A, i.e. as much as possible near to the center of the intermediate chamber 70. Because the secondary fluid is introduced deeply into the stream of aerated pasty product in the apparatus, not only at it surface along the inner wall 111 of the housing 100, the secondary product may be homogeneously mixed into the aerated pasty product. If the secondary product solidifies (partially or completely) after introduction into the stream of pasty product, or, more generally speaking if its physical properties change after introduction into the pasty product, this change of properties is enhanced thanks to the introduction of said secondary fluid deeply into the pasty product stream and the increase of travel time of the secondary fluid introduced before it reaches the fourth set of a rotor and a stator 24.

In the represented embodiment of FIG. 4, the apparatus is provided with two secondary product introduction means 80. Multiple secondary product introduction means provide a good initial distribution of the secondary product in the aerated pasty product.

A hollow jacket (not represented) may be provided around the housing 100. The jacket and the housing define a space for circulation of a coolant or heating fluid. The use of a jacket makes it possible to maintain the product to be aerated at a desired temperature. In some embodiments a coolant fluid is circulated in the jacket in order to maintain a chilled temperature in the product flowing through the apparatus. The circulation of a coolant fluid makes it possible to prevent the uptake of heat energy that would be generated by the rotation speeds inside the mixing apparatus. Advantageously, this helps to maintain the degree and stability of the aeration in the product. Any coolant or heating fluid may be envisaged. Exemplary coolant fluids include air or water at cold temperature. The temperature of the coolant or heating fluid can be adapted depending on the product to be aerated and the desired aeration properties of the product.

Various configurations of sets of a rotor and a stator as well as various configurations of housings may be used in apparatuses according to various embodiments of the invention, as illustrated by way of example in FIG. 1, FIG. 2, and FIG. 3 and FIG. 4. In some embodiments, O-Rings 91 may be used to provide a seal between several parts of apparatus. O-rings 91 may be used to provide the modules forming the housing with a seal, to avoid a leakage of product outside the apparatus. O-rings 91 may also be used between the sets of a rotor and a stator and internal parts of the housing as hereafter explained, and between the shaft 3 and the sets of a rotor and a stator.

The number, width and/or spacing of rotor/stator teeth can vary between the sets of a rotor and a stator within a mixing apparatus. In embodiments each set of a rotor and a stator has substantially the same number, width and/or spacing of rotor/stator teeth. The external diameter of the toothed rims of each set of a rotor and a stator may be substantially the same. The internal diameter of the toothed rims of each set of a rotor and a stator may be substantially the same.

In some embodiments, each set of a rotor and a stator is removable and interchangeable, offering flexibility. For instance different numbers, widths and spacing between the teeth of the rotor-stator toothed rims can therefore be changed as desired for each set of a rotor and a stator within the mixing apparatus depending on the properties of the food product to be aerated and the desired aeration result.

According to embodiments, the sets of a rotor and a stator may have all the same diameter or different diameters. For example, an aligned configuration in which all sets of a rotor and a stator have the same diameter makes it possible to control the shear and cutting forces applied along the mixing apparatus and provides a substantially constant flow rate of product through the apparatus.

Figure 5:
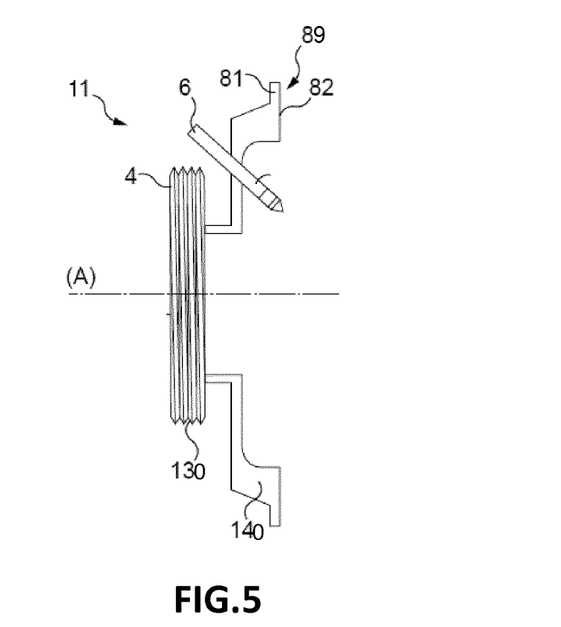
FIGS. 5 and 6 are schematic cross-sectional representations of inlet modules which may be used in the invention.
Figure 6:
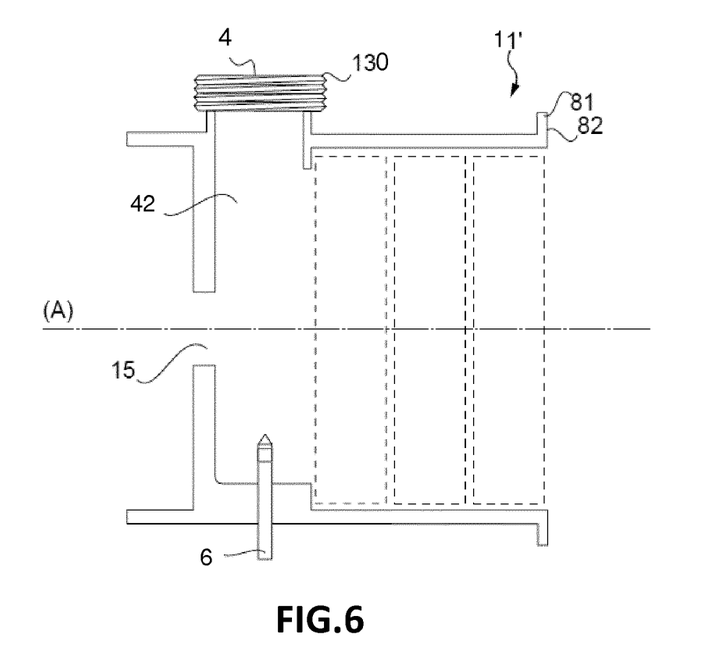

In contrast a conical and radially staggered configuration of the plurality of sets of a rotor and a stator, in which each set has a larger or smaller diameter than the directly upstream one, produces a variation of the speed of the product stream inside the apparatus. An advantage of apparatuses according to the invention is to provide "late-differentiation" of the final product. For instance, a same food matrix may be introduced as pasty product into the apparatus for several final products. Gas is injected into the food matrix through the gas injector 1. Then a secondary product is injected into the foamed food matrix through the fluid injector 8 (or other secondary product introduction means (e.g secondary product introduction means 80)). By changing the secondary product introduced, the final product may be changed easily. FIGS. 5 and 6 are schematic cross-sectional representations of inlet modules which may be used in the invention to form an apparatus according to the invention.

FIG. 5 represents an inlet module 11. The inlet module comprises a product inlet 4 and a gas injector 6. The inlet module 11 has a general shape of a solid of revolution, around the axis A.

The product inlet 4 is configured for receiving a stream of a pasty (e.g. liquid or semi-liquid) product to be aerated from a product feed-line. The product inlet 4 is provided for example with a tapping 130 to sealingly screw the product feed line to said product inlet 4.

In the embodiment of FIG. 5, the product inlet is located centrally in the inlet cover, along the axis A. This makes it possible to provide a large inlet opening into the inlet module 11 (and thus into the mixing apparatus comprising the inlet module 11). The introduction of a base product into the apparatus may be performed in the same direction as the flow of the product into the apparatus. A large opening and no change of direction of the product flow generates very few head losses. However, a shaft (used in the apparatus to drive rotors of sets of a rotor and a stator for whipping or mixing the product flowing in said apparatus) cannot be introduced through the inlet module along the main axis A. In a mixing apparatus using the inlet module 11 of FIG. 5, such as the apparatuses of FIGS. 1 to 3 that have been previously described in detail, a drive shaft has to enter the apparatus by the other end of the apparatus, i.e. by the outlet module (provided that the apparatus has a longitudinal configuration along the axis A).

The inlet module 11 of FIG. 5 has a small length (dimension along the axis A), and may be seen as a cover. The housing part 140 formed by the inlet module provides only a sufficient inside free space for the gas injector to protrude into the apparatus without exiting the inlet module outer shape.

The position of the gas injector 6 is important for providing an efficient incorporation of the gas into the pasty product stream, e.g. for producing regular and uniform gas bubbles in the pasty product stream.

The gas injector 6 can be positioned with its central axis parallel to the axis A of the apparatus (and/or product inlet) or inclined (as in FIG. 5) at an angle of from 10° to about 85° relative to said axis A. The inclination of the central axis of the gas injector 6 makes it possible to optimize the flow of the injected gas onto the teeth of the first set of a rotor and a stator of the mixing apparatus comprising the inlet module 11. The position of the gas injector tip provides good control of the applied shearing and cutting forces and avoids the formation of gas pockets in the product stream.

The inlet module is provided with an assembly interface 89, configured to be attached to a corresponding interface of any intermediate module. "Corresponding" means that the interfaces are configured to be attached together. They may be identical. Example embodiments of assembly interfaces which may be used in the invention are described in more detail hereafter with reference to FIGS. 14 and 15.

The assembly interface of the inlet module 1 of FIG. 5 consists of a collar 81 which is integral with the module and which extends perpendicularly to the axis A at a periphery of an interface face 82 of the module. The collar 81 forms a flat annular interface which may be placed in contact with and tightened against an interface (having the same shape) of an intermediate module. An optional seal (e.g. an O-ring) may be placed between the interface faces.

FIG. 6 represents an inlet module 11'. The inlet module 11' comprises, like the inlet module of FIG. 5, a product inlet 4 and a gas injector 6.

The product inlet 4 is configured for receiving a stream of a pasty (e.g. liquid or semi-liquid) product to be aerated from a product feed-line. The product inlet 4 is provided for example with a tapping 130 to sealingly screw the product feed line to said product inlet 4.

The inlet module 11' has a general shape of a solid of revolution, around the axis A. However, in the embodiment of FIG. 6, the product inlet is located on a side of the inlet module. More particularly, the product inlet is substantially at a right angle to the axis A. In other variant embodiments, the product inlet may form an acute angle relative to the axis A. The product inlet is preferably arranged on a peripheral side of the inlet module, because a hole of inlet module 15 is formed at an end of the inlet module 11' along the axis A. The hole is adapted to the introduction of a shaft (to drive rotors of sets of rotors and stator) into the inlet module 11'.

The housing part 140 of the example inlet module 11' of FIG. 6 is configured to accommodate up to three sets of a rotor and a stator. The places where sets of a rotor and a stator may be located are represented in dotted lines in FIG. 6.

The product inlet may open into an inlet chamber 42. In general terms, the inlet chamber 42 consists in a volume free of mechanical parts except for the gas injector 6, situated in the inlet module upstream of the first set of a rotor and a stator.

Figure 7:
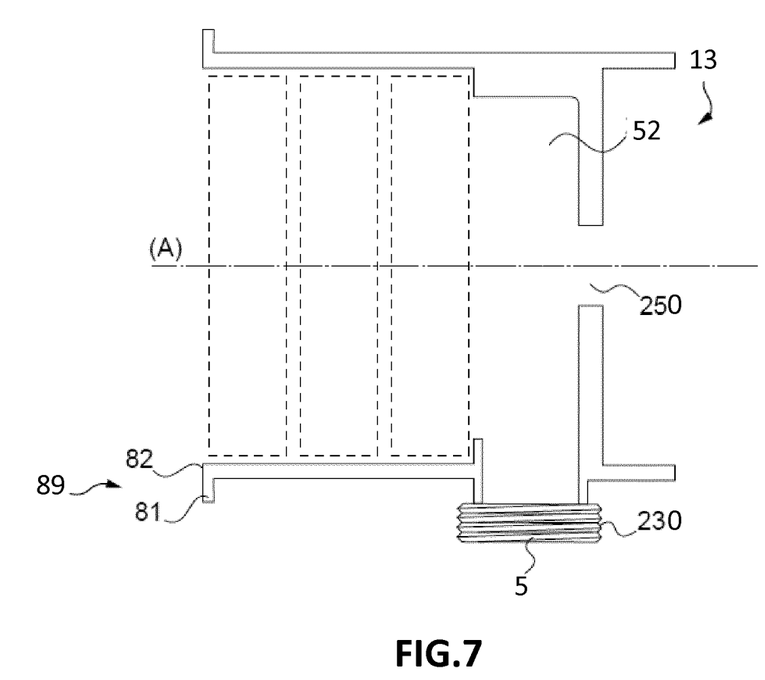
FIGS. 7 and 8 are schematic cross-sectional representations of outlet modules which may be used in the invention.
Figure 8:
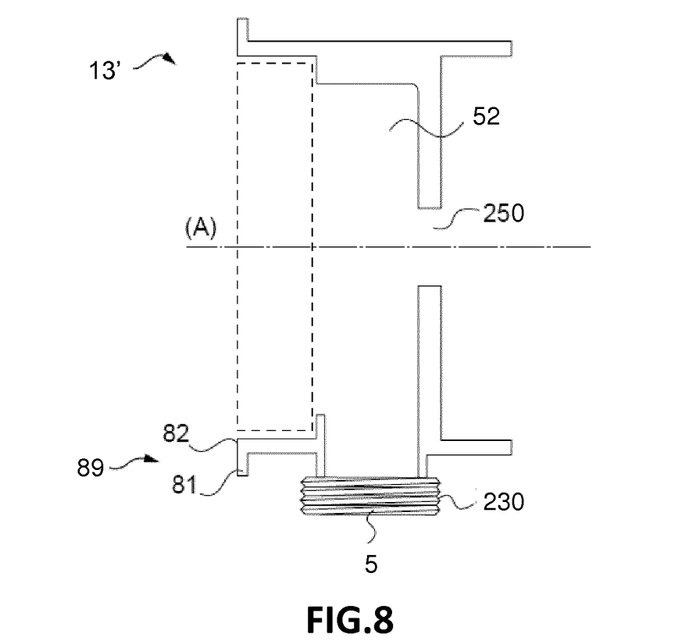

The inlet module 11' is provided with an assembly interface 89, configured to be attached to a corresponding interface of any intermediate module. The interface 89 of the represented embodiment is identical to the interface of the inlet module of FIG. 5. Thus the interface of the inlet module 11' of FIG. 5 comprises a collar 81 which forms a flat annular interface at the interface face 82 of the module. FIGS. 7 and 8 are schematic cross-sectional representations of outlet modules which may be used in the invention.

FIG. 7 represents a first example embodiment of an outlet module 13. The outlet module 13 is essentially identical to the inlet module 11' of FIG. 6, except that it does not comprise a gas injector. The hole provided in the inlet module 11' for the gas injector may be absent from the outlet module 13 (as shown in FIG. 7) or may be sealed, for example by a sealing screw.

The outlet module 13 comprises a product outlet 5. The product outlet 5 is provided for example with a tapping 230 to sealingly screw a product outlet line to said product outlet 5.

In the represented embodiment, the product outlet is substantially at a right angle to the longitudinal axis A. In other variant embodiments, the product outlet may form an acute angle relative to the longitudinal axis A. The product outlet 5 is preferably arranged on a peripheral side of the inlet module. This makes it possible to provide a hole of outlet module 250 at an end of the outlet module 13, along the axis A. The hole of the outlet module 250 is adapted to the introduction of a shaft (to drive rotors of sets of a rotors and a stator) into the outlet module 13.

The product outlet may open into an outlet chamber 52. The outlet chamber 52 essentially consists in a volume free of mechanical parts situated in the outlet module downstream of the last set of a rotor and a stator.

Like the inlet module 11' of FIG. 6, the outlet module 13 is configured to accommodate up to three sets of a rotor and a stator. The places where sets of a rotor and a stator may be located are represented in dotted lines in FIG. 7.

The outlet module 13 is provided with an assembly interface 89, configured to be attached to a corresponding interface of any intermediate module. The interface 89 of the represented embodiment is identical to the interface of the inlet module of FIG. 5 or FIG. 6. Thus the interface 89 of the outlet module 13' of FIG. 5 comprises a collar 81 which forms a flat annular interface at the interface face 82 of the module.

FIG. 8 represent another embodiment of an outlet module 13'. The embodiment of FIG. 8 is identical to the embodiment of FIG. 7, except that the outlet module is adapted to accommodate only one set of a rotor and a stator (at the place represented in dotted lines in FIG. 8).

FIGS. 9 to 13 are schematic cross-sectional representations of intermediate modules which may be used in the invention.

The intermediate modules used in the invention may have various sizes, shapes, and functions.

For example, the intermediate modules may have one or several of the following functions: whipping or mixing the product flowing in the apparatus, providing a free space for example for enhancing mixing or overrun (expansion percentage) of the product, introducing a secondary product which may be a gas, a liquid, solid pieces, or any combination thereof, into the product. Mixing uses one or several sets of a rotor and a stator. Whipping requires the introduction of gas upstream one (or several) whipping set of a rotor and a stator.

Figure 9:
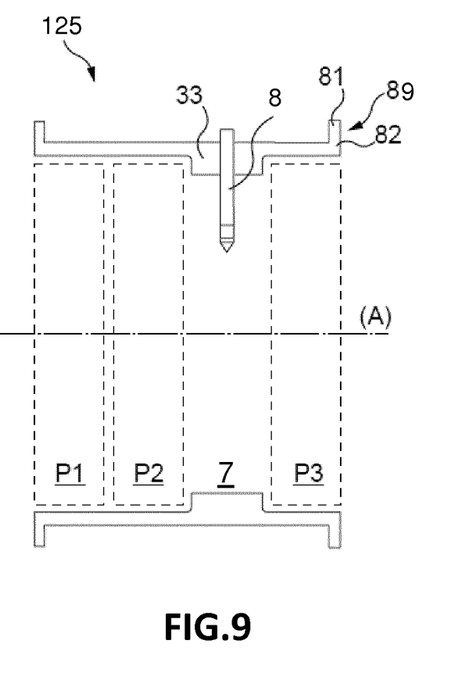
FIGS. 9 to 13 are schematic cross-sectional representations of intermediate modules which may be used in the invention.

The example embodiment of an intermediate module 125 of FIG. 5 comprises three places where a set of a rotor and a stator may be placed. A first place P1 and a second place P2 are situated on one side of an intermediate chamber 7 of the intermediate module 3. A third place P3 is situated on the other side of the intermediate chamber 7. The notion of "side" is considered along the axis A.

The intermediate chamber is a free space where a secondary product may be introduced, for example by a secondary product injector 8 (e.g. a gas or liquid injector) as in the represented embodiment of FIG. 9, or by other introduction means.

A step 33 is provided in the intermediate chamber 7. Provided that the intermediate module 125 as a general cylindrical shape the step 33 may correspond to a reduction of the inner diameter of the module (along the intermediate chamber). The step 33 helps to maintain in the longitudinal direction (i.e. in the direction of the axis A) the sets of a rotor and a stator (or other components) placed in the first, second, and third places P1, P2, P3.

Both ends of the intermediate module 125 are provided with an assembly interface 89, which is identical to the previously described interfaces of the inlet and outlet modules. Both ends of the intermediate module 125 can be mounted to a corresponding interface of one of an inlet module 11,11', an outlet module 13, 13', and intermediate module 125-129. This also makes it possible to mount the intermediate module in both directions, i.e. to choose which of the two ends of the intermediate module will be upstream and which will be downstream in the mixing apparatus comprising the intermediate module. This is also the case for all the intermediate modules that are hereafter described by way of example, and the variant embodiments of intermediate modules that may be derived from the described example by the person skilled in the art.

Figure 10:
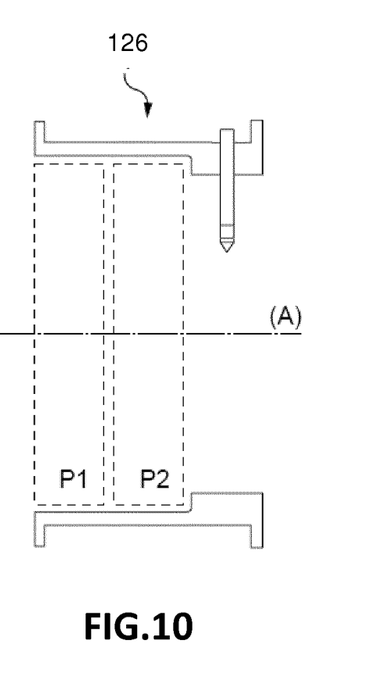

The intermediate module 126 of FIG. 10 is identical to the intermediate module 125 of FIG. 9, except that it does not provide a third place P3 for a set of a rotor and a stator (or other compatible component).

Figure 11:
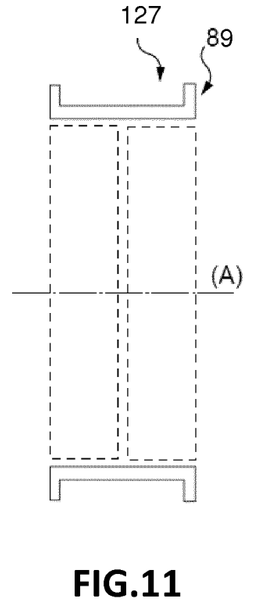

The intermediate module 127 of FIG. 11 has the general shape of a cylinder into which one or two sets of a rotor and a stator may be placed. Possible locations where sets of a rotor and a stator may be placed are represented in dotted lines. In a mixing apparatus comprising the intermediate module 127, said intermediate module may be left empty to provide a free chamber for example between devices such as sets of a rotor and a stator. The intermediate module 127 is provided with an interface 89 at both of its ends (along axis A) which makes it possible to attach each end of the intermediate module 127 to a corresponding interface of an inlet module, an outlet module, or an intermediate module.

Figure 12:
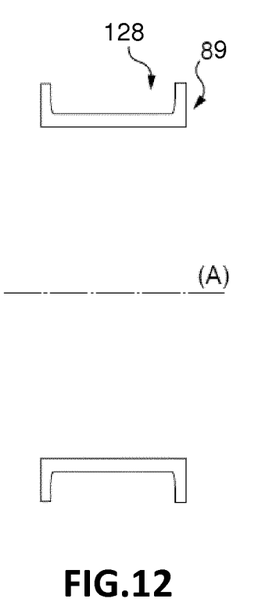

The intermediate module 128 of FIG. 12 (like the intermediate module 127 of FIG. 11), has the general shape of a cylinder. However, it is provided with a smaller inner diameter than the intermediate module 127 of FIG. 11. The intermediate module 128 of FIG. 12 may be used to space consecutive sets of a rotor and a stator while providing a longitudinal (along axis A) maintaining of said sets of a rotor and a stator, and/or to provide an intermediate free chamber. The intermediate module 128 is provided with an interface 89 at both of its ends (along axis A) which makes it possible to attach each end of the intermediate module 6 to a corresponding interface of an inlet module, an outlet module, or an intermediate module.

Figure 13:
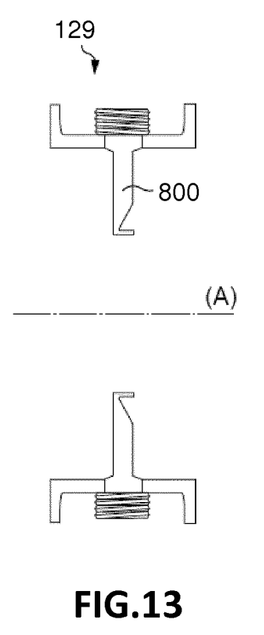

The intermediate module 129 of FIG. 13 is a variant of the intermediate module 128 of FIG. 12, comprising introduction means for a secondary product. In the represented embodiment, the introduction means comprises two pipes 800 protruding into the inner volume of the intermediate module 129. The pipes 800 are each provided with a screw thread (outside the housing part formed by the intermediate module 129) for the connection of a secondary product line. Each pipe 800 ends in the intermediate module 129 by a large aperture, which is in this embodiment parallel to the axis A. The represented secondary product introduction means are particularly suited to the introduction of a viscous or semi-liquid secondary product and/or of a secondary product comprising solid pieces or grains/granules.

In other alternative embodiments, other secondary product introduction means may be provided, in any of the inlet, outlet, or intermediate modules. For example, the intermediate module 125 or the inlet module 11, 11' may be provided with a pipe adapted to the introduction of a viscous product or a product comprising solid pieces. The intermediate module 129 may be provided with a secondary gas or liquid injector. Any secondary product introduction means may be provided on the intermediate module 127, or in an outlet module 13, 13'.

The described inlet, outlet, and intermediate modules should be considered as non-exhaustive example embodiments that make it possible to form the mixing apparatus represented in FIGS. 1-4. Many alternative embodiments are possible within the scope of the invention.

Some or all the described modules, as well as other modules that can be adapted from the described modules or designed for a specific purpose, form a set (or "bank") of modules in which modules may be chosen to form a desired apparatus for aerating a pasty product.

Figure 14:
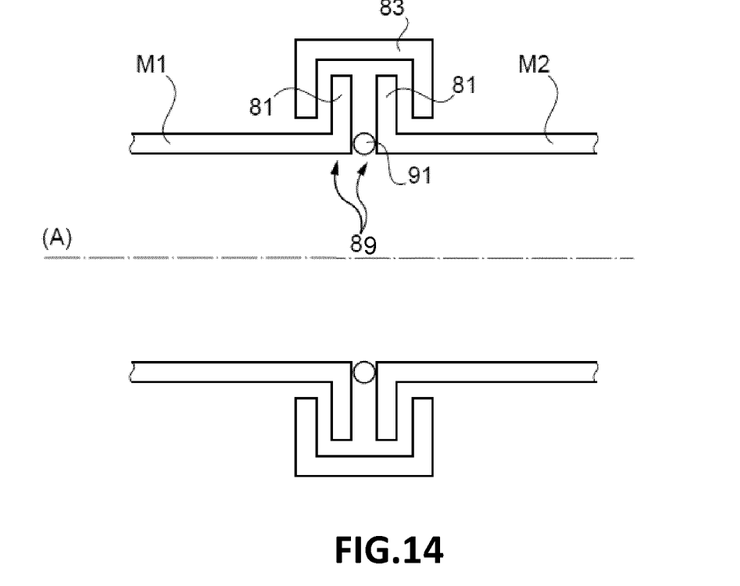
FIGS. 14 and 15 are example embodiments of assembly interfaces between modules, which may be used in the invention.

It should be noted that the interface 89 is only an example of possible interfaces to attach compatible modules. FIG. 14 illustrates how two modules, namely a first module M1 (which is an inlet, outlet, or intermediate module) and a second module M2 (which is an inlet, outlet, or intermediate module) may be attached together via their respective interface 89.

A clamp 83 may be used around the collars 81 of the interface 89 to press and hold them. A seal such as an O-ring 91 may be provided between the modules to avoid product leakage.

Figure 15:
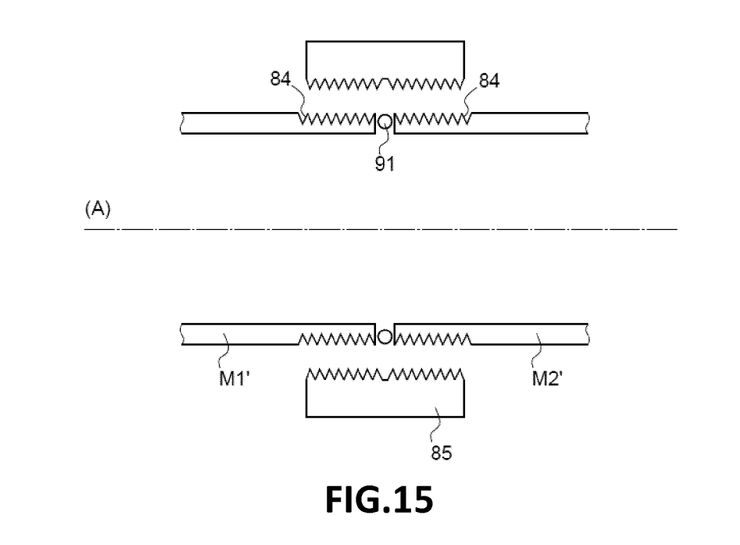

FIG. 15 illustrates that other types of interfaces may be used to attach two modules together. A first module M1' is provided with an end having an external screw thread 84. A second module M2' is provided with an end having a same external screw thread 84. The first and second modules are linked by a tapped ring or nut 85, having an internal tapping whose direction changes at substantially the middle of the tapping.

Many apparatuses for aerating a pasty product may be formed in a similar way, based on a set of modules. For forming an apparatus according to the invention there must be in the set of modules:
at least one inlet module comprising a product inlet and a gas injector;
at least one intermediate module; and
at least one outlet module, comprising a product outlet opening; All the modules of the set have corresponding assembly interfaces. This means that each module may be assembled to any other module of the set. In practice, there are advantageously more than three available modules in the set, so that a selection of modules can be performed. In particular, many intermediate modules having different functions (one or several functions per module) may be provided.

This provides a modular apparatus for aerating a pasty product, and industrial flexibility when an apparatus has to be designed for aerating a new pasty product (whether or not based on an existing commercial product). The modular construction of an apparatus for aerating a pasty product makes it possible to adapt the design of the apparatus to the product to be produced, easily and relatively quickly. For example, if the pasty product is a food product, the apparatus may be adapted to a change of recipe.

The modules, and in particular the intermediate modules may be chosen based on the desired function: whipping or mixing the product flowing in the apparatus, providing a free space for example for enhancing mixing of the product, introducing a secondary product into the product, or any other function.

The mixing apparatuses of the invention may advantageously be used for the aeration of pasty products in a wide variety of applications, for example in the food or cosmetic industries. Particular applications are for the aeration of liquid and semi-liquid foodstuffs, for instance in the aeration of dairy products, confectionery, ice-cream or other liquid and semi-liquid foodstuffs. Examples of the injected liquid or semi-liquid secondary product include caramel and chocolate at an elevated temperature where such additional secondary products can be injected and are cooled by the aerated product to form solid particles. The downstream set of a rotor and a stator (e.g. the second set) will then crush or comminute the additional composition e.g. to form a granulate with particles, grains or chips in the aerated product.

In other embodiments, the invention provides a method of aerating a liquid or pasty product, preferably a foodstuff, using a mixing apparatus as described herein above.

The invention claimed is:

1. An apparatus for aerating a pasty product, the apparatus comprising:
a housing extending in a longitudinal direction, the housing comprising an inlet for the pasty product to be aerated and an outlet for the aerated pasty product;
within the housing, at least a first set of a rotor and a stator and a second set of a rotor and a stator, the at least each set of the rotor and the stator having complementary toothed rims oppositely orientated in the longitudinal direction;
a drive shaft, the rotors of the at least each set of the rotor and the stator being coupled to the drive shaft;
a gas injector for injecting, upstream of the first set of the rotor and the stator, a gas into the pasty product to be aerated;
an intermediate mixing chamber provided in the housing between the first and the second sets of the rotor and the stator; and
a secondary product introduction member which protrudes into the intermediate mixing chamber so as to issue into the intermediate mixing chamber.

2. The apparatus according to claim 1, wherein the secondary product introduction member comprises a fluid injector.

3. The apparatus according to claim 1, wherein the secondary product introduction member forms a secondary pasty product inlet.

4. The apparatus according to claim 1, wherein the intermediate mixing chamber has a cylindrical shape centered on a shaft rotation axis and wherein the secondary product introduction member protrudes in the intermediate mixing chamber at a distance from an external surface of the shaft comprised between 10% and 95% of the distance, along a radius of the intermediate mixing chamber, between the external surface of the shaft and a wall of the housing.

5. The apparatus according to claim 1, wherein the housing comprises an internal annular step along a length, in the longitudinal direction, of the intermediate mixing chamber.

6. The apparatus according to claim 5, wherein the intermediate mixing chamber has a cylindrical shape centered on a shaft rotation axis, having a diameter which is lower than a diameter of the rotor of the first set and/or the second set.

7. The apparatus according to claim 1, wherein the intermediate mixing chamber is a volume free of mechanical parts except for a fluid injector.

8. The apparatus according to claim 1, wherein the intermediate mixing chamber has a length corresponding to at least a length of the first or second set of the rotor and the stator.

9. The apparatus according to claim 1, wherein the housing comprises, in the longitudinal direction, a plurality of modules,
the plurality of modules comprising:
an inlet module comprising a product inlet and a gas injector;
at least one intermediate housing module, configured to form the intermediate mixing chamber, and
an outlet module, comprising a product outlet opening.

10. The apparatus according to claim 9, wherein the at least one intermediate housing module is arranged to receive at least one of the at least each set of the rotor and the stator.

11. The apparatus according to claim 1, wherein the rotor of the at least each set of the rotor and the stator is coupled to the longitudinal drive shaft and the stator of the at least each set of the rotor and the stator is coupled to the housing.

12. The apparatus according to claim 1, further comprising a first shaft coupled to the rotor of the first set of the rotor and the stator, and a second shaft coupled to the rotor of the second set of the rotor and the stator.

13. The apparatus according to claim 12, wherein the first shaft and the second shaft are coaxial with a longitudinal axis of the apparatus.

14. The apparatus according to claim 12, wherein the apparatus is configured to drive the first shaft and the second shaft at different rotational speeds and/or in opposite directions.

15. The apparatus according to claim 12, further comprising an independent driver rotationally driving the first shaft and the second shaft respectively.

16. The apparatus according to claim 12, wherein an intermediate chamber is formed between a pair of a rotor and a stator coupled to the first shaft and a pair of a rotor and a stator coupled to the second shaft.

17. The apparatus according to claim 1, wherein the intermediate mixing chamber has a cylindrical shape having a radius, and the secondary product introduction member protrudes into the intermediate mixing chamber between 25% and 50% of the radius of the intermediate mixing chamber.

18. The apparatus according to claim 1, wherein the secondary product introduction member comprises a tube having a diameter and an opening positioned inside the intermediate mixing chamber.

19. The apparatus according to claim 1, wherein the secondary product introduction member is configured to introduce a secondary product into the intermediate mixing chamber.

20. The apparatus according to claim 19, wherein the secondary product comprises a material selected from the group consisting of a liquid, a semi-liquid, a gas, and combinations thereof.

* * * * *